(12) United States Patent
Kim

(10) Patent No.: US 9,269,930 B2
(45) Date of Patent: Feb. 23, 2016

(54) RECHARGEABLE BATTERY

(71) Applicants: SAMSUNG SDI CO., LTD., Yongin-si, Gyeonggi-do (KR); ROBERT BOSCH GMBH, Stuttgart (DE)

(72) Inventor: Duk-Jung Kim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 150 days.

(21) Appl. No.: 13/921,413

(22) Filed: Jun. 19, 2013

(65) Prior Publication Data
US 2014/0205896 A1   Jul. 24, 2014

(30) Foreign Application Priority Data
Jan. 21, 2013   (KR) .................. 10-2013-0006658

(51) Int. Cl.
*H01M 2/04* (2006.01)
*H01M 2/30* (2006.01)

(52) U.S. Cl.
CPC ............ *H01M 2/043* (2013.01); *H01M 2/0473* (2013.01); *H01M 2/0491* (2013.01); *H01M 2/305* (2013.01)

(58) Field of Classification Search
CPC .... H01M 2/043; H01M 2/305; H01M 2/0491
USPC ............................................ 429/82, 179, 163
See application file for complete search history.

(56) References Cited

U.S. PATENT DOCUMENTS

| | | | |
|---|---|---|---|
| 2005/0064284 A1* | 3/2005 | Sumiyama et al. | 429/174 |
| 2006/0216592 A1* | 9/2006 | Chun | 429/175 |
| 2006/0240320 A1 | 10/2006 | Cheon et al. | |
| 2011/0200870 A1 | 8/2011 | Kim et al. | |
| 2011/0287310 A1* | 11/2011 | Byun et al. | 429/181 |

FOREIGN PATENT DOCUMENTS

| | | |
|---|---|---|
| KR | 10-2006-0112034 A | 10/2006 |
| KR | 10-2011-0093372 A | 8/2011 |

* cited by examiner

*Primary Examiner* — Cynthia H Kelly
*Assistant Examiner* — Monique Wills
(74) *Attorney, Agent, or Firm* — Lee & Morse, P.C.

(57) ABSTRACT

A rechargeable battery including an electrode assembly including a positive electrode and a negative electrode; a case including a space receiving the electrode assembly; a cap plate coupled with the case; and a terminal electrically connected to the electrode assembly, the terminal protruding outside of the cap plate, wherein a top of the cap plate has a slanted surface.

14 Claims, 7 Drawing Sheets

RECHARGEABLE BATTERY

CROSS-REFERENCE TO RELATED APPLICATION

Korean Patent Application No. 10-2013-0006658 filed on Jan. 21, 2013, in the Korean Intellectual Property Office, and entitled: "RECHARGEABLE BATTERY," is incorporated by reference herein in its entirety.

BACKGROUND

1. Field

Embodiments relate to a rechargeable battery.

2. Description of the Related Art

A rechargeable battery is a battery that can be charged and discharged, unlike a primary battery that cannot be charged. A low-capacity rechargeable battery may be used for small portable electronic devices, e.g., a mobile phone, a laptop computer, and a camcorder. A large-capacity battery may be used as a power supply for driving a motor, e.g., for a hybrid car.

A high power rechargeable battery using a non-aqueous electrolyte may have a high energy density. The high power rechargeable battery may be configured as a large-capacity rechargeable battery by connecting a plurality of rechargeable batteries in series to be able to be used for devices requiring a large amount of power, e.g., for driving a motor such as an electric vehicle.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly including a positive electrode and a negative electrode; a case including a space receiving the electrode assembly; a cap plate coupled with the case; and a terminal electrically connected to the electrode assembly, the terminal protruding outside of the cap plate, wherein a top of the cap plate has a slanted surface.

The slanted surface may be at a side edge of the cap plate.

The cap plate may have a rectangular plate shape, and the slanted surface may be at both side edges of the cap plate with respect to a widthwise direction of the cap plate.

The cap plate may have a rectangular plate shape, and the slanted surface may be on both side edges of the cap plate with respect to a lengthwise direction of the cap plate.

The case may include a slant unit at a top thereof, the slant unit being slanted and being connected to the slanted surface of the cap plate.

The slanted surface may extend from one side edge of the cap plate in a widthwise direction to another side edge of the cap plate.

The slanted surface may extend toward both side edges of the cap plate in a lengthwise direction from a center of the cap plate.

The slanted surface may extend toward both side edges of the cap plate in a widthwise direction from a center of the cap plate.

The slanted surface may be slanted toward a bottom of the cap plate.

The rechargeable battery may further include a top insulation member that insulates the terminal from the cap plate, the top insulation member being at a bottom of the terminal and having a transverse cross-sectional area that is gradually increased in a direction away from the cap plate.

The rechargeable battery may further include a top insulation member that insulates the terminal from the cap plate, the top insulation member being at a bottom of the terminal and including an upwardly slanted avoider on a side thereof.

A water-repellent coating process may be applied to the slanted surface of the cap plate.

The rechargeable battery may further include a water-repellent coating on the slanted surface of the cap plate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
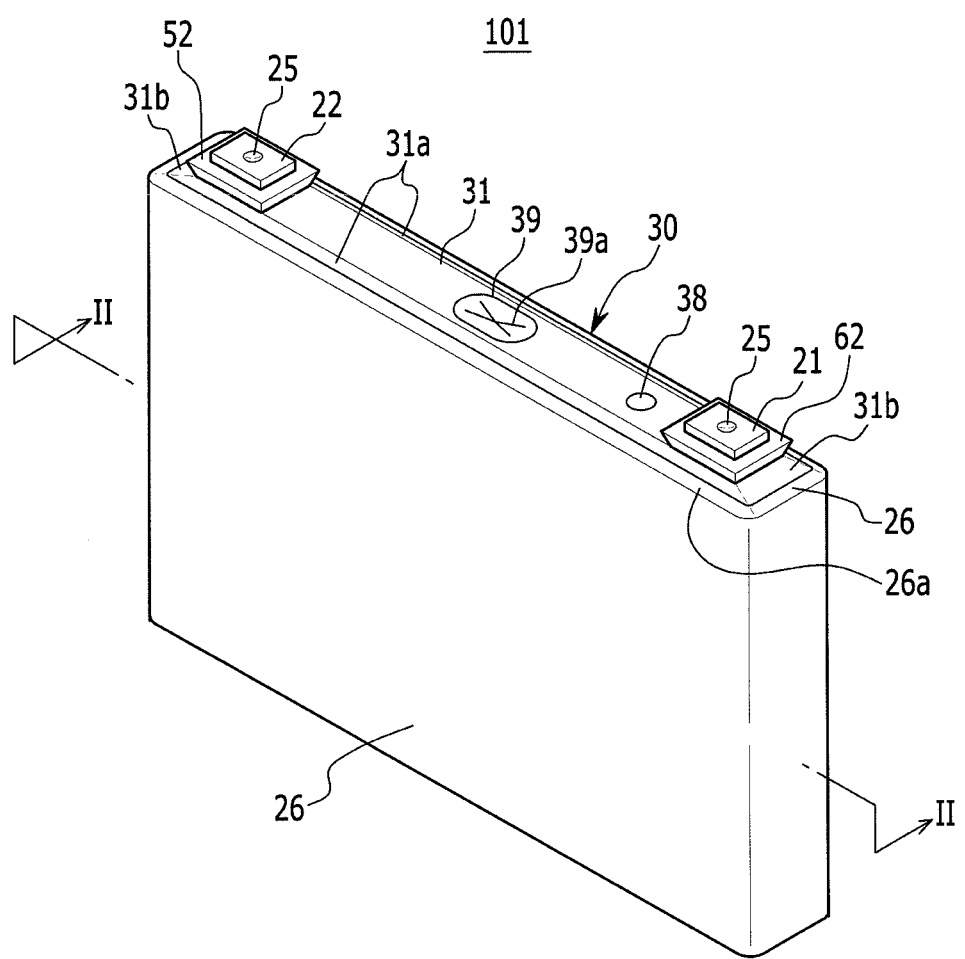
FIG. 1 illustrates a perspective view of a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the following detailed description, only certain exemplary embodiments have been shown and described, simply by way of illustration. As those skilled in the art would realize, the described embodiments may be modified in various different ways, all without departing from the spirit or scope of the embodiments. Like reference numerals designate like elements throughout the specification and drawings.

Figure 2:
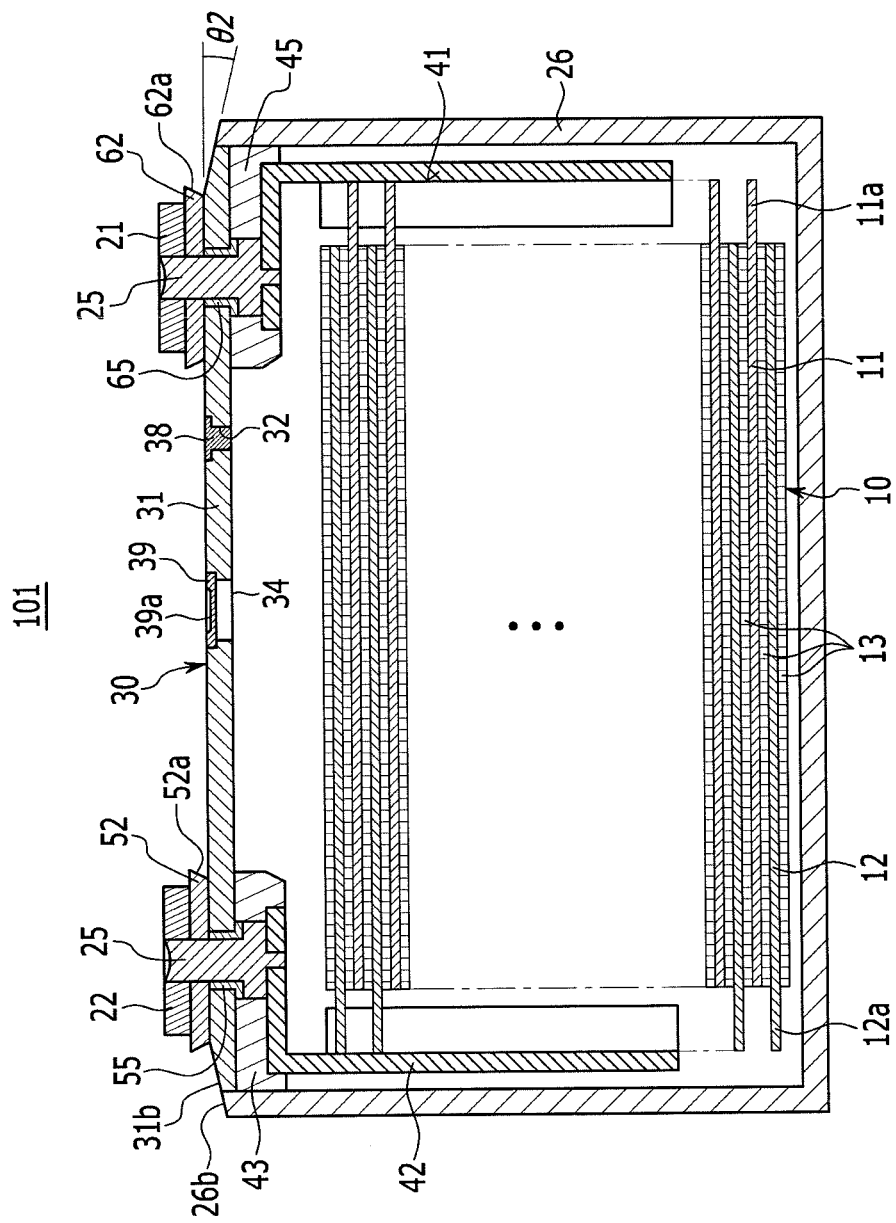
FIG. 2 illustrates a cross-sectional view with respect to a line of II-II in FIG. 1.
Figure 3:
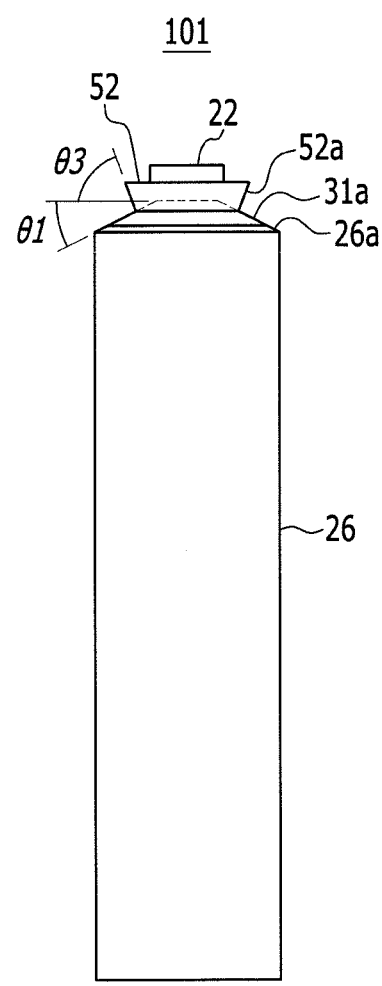
FIG. 3 illustrates a side view of the rechargeable battery of FIG. 1.

FIG. 1 illustrates a perspective view of a rechargeable battery according to an embodiment. FIG. 2 illustrates a cross-sectional view with respect to a line of II-II in FIG. 1. FIG. 3 illustrates a side view of the rechargeable battery of FIG. 1.

Referring to FIG. 1 and FIG. 2, the rechargeable battery 101 may include an electrode assembly 10 (spirally wound with a separator 13 between a positive electrode 11 and a negative electrode 12), a case 26 receiving or accommodating the electrode assembly 10, and a cap assembly 30 combined to or coupled with an opening of the case 26.

A square-type or prismatic lithium ion secondary battery will be exemplarily described for the rechargeable battery 101. However, the embodiments are not restricted thereto, and various kinds of batteries, e.g., a lithium polymer battery or a cylindrical battery may be used.

The positive electrode 11 and the negative electrode 12 may include a coated region (generated by coating an active material on a current collector formed with a thin-plate metal foil), and uncoated regions 11a and 12a (on which the active material is not coated). The positive uncoated region 11a may be formed at one end of the positive electrode 11 in a lengthwise direction of the positive electrode 11, and the negative uncoated region 12a may be formed at another end of the negative electrode 12 in a lengthwise direction of the negative electrode 12. The positive electrode 11 and the negative electrode 12 may be spirally wound with the separator 13, which is an insulation member, therebetween.

However, the embodiments are not restricted thereto, and the electrode assembly 10 may be configured by, e.g., stacking the positive electrode and the negative electrode formed with a plurality of sheets with a separator therebetween.

The case 26 may have a substantially cuboidal shape, and an opening may be formed on one side of the case 26. The case 26 may be made of metal, e.g., aluminum or stainless steel.

The cap assembly 30 may include a cap plate 31 (for covering the opening of the case 26), a positive terminal 21 protruding outside the cap plate 31 and electrically connected to the positive electrode 11, and a negative terminal 22 protruding outside the cap plate 31 and electrically connected to the negative electrode 12.

The cap plate 31 may be formed as a thin square or rectangular plate, e.g., extended in one direction, and may be coupled with the case 26 at the opening in the case 26. The cap plate 31 may be formed with or of a metal, e.g., aluminum. A seal stopper 38 may be installed in an electrolyte injection opening 32 of the cap plate 31, and a vent member 39 (having a notch 39a adapted to fracture at a threshold or predetermined pressure) may be installed in a vent hole 34.

The positive terminal 21 and the negative terminal 22 may be installed to protrude at a top of the cap plate 31. The positive terminal 21 may be electrically connected to the positive electrode 11 through a current collector 41, and the negative terminal 22 may be electrically connected to the negative electrode 12 through a current collector 42.

A terminal connection member 25 (for electrically connecting the positive terminal 21 and the current collector 41) may be installed between the positive terminal 21 and the current collector 41. The terminal connection member 25 may be inserted into a hole formed in the positive terminal 21, a top thereof may be fixed to the positive terminal 21 through welding, and an end thereof may be fixed to the current collector 41 through welding.

A gasket 65 (for sealing) may be inserted into a hole through which the terminal connection member 25 penetrates and between the terminal connection member 25 and the cap plate 31. A bottom insulation member 45 (into which a bottom of the terminal connection member 25 is inserted) may be installed below the cap plate 31.

A top insulation member 62 (for electrically insulating the positive terminal 21 and the cap plate 31) may be installed at a bottom of the positive terminal 21, e.g., between the positive terminal 21 and the cap plate 31. The terminal connection member 25 may be inserted into the top insulation member 62.

Another terminal connection member 25 (for electrically connecting the negative terminal 22 and the current collector 42) may be installed between the negative terminal 22 and the current collector 42

The other terminal connection member 25 may be inserted into a hole formed in the negative terminal 22, a top thereof may be fixed to the negative terminal 22 through welding, and a bottom thereof may be fixed to the current collector 42 through welding.

A gasket 55 (for sealing) may be inserted into a hole (through which the terminal connection member 25 penetrates) and between the negative terminal 22 and the cap plate 31. A bottom insulation member 43 (for insulating the negative terminal 22 and the current collector 42 at the cap plate 31) may be installed below the cap plate 31.

A top insulation member 52 (for electrically insulating the negative terminal 22 and the cap plate 31) may be installed at the bottom of the negative terminal 22, e.g., between the negative terminal 22 and the cap plate 31. The terminal connection member 25 may be installed in the top insulation member 52.

As shown in FIG. 1 and FIG. 3, a first slanted surface and a second slanted surface may be formed on a side of the cap plate 31.

The cap plate 31 may have a square or rectangular plate shape. The first slanted surface 31a may be formed on both ends or sides of the cap plate 31 in a widthwise direction, and the second slanted surface 31b may be formed on both ends or sides of the cap plate 31 in a lengthwise direction. In other words, as will be apparent to a person of ordinary skill in the art from the foregoing description and from the drawings, the first slanted surface 31a may extend along long side edges of the cap plate 31, the second slanted surface 31b may extend along short side edges of the cap plate 31, and a top of the cap plate 31 may be flat or parallel with a bottom surface of the rechargeable battery 101.

The first slanted surface 31a may be slanted so that a transverse cross-sectional area thereof is increased toward a bottom of the cap plate 31, e.g., the first slanted surface 31a may be slanted toward the case 26 from the flat top of the cap plate 31. For example, the first slanted surface 31a may be slanted with an oblique angle toward the bottom (with respect to an arrangement in which the case 26 stands so that the terminals 21 and 22 face upwardly) with respect to a plane or surface that is parallel with the flat top of the cap plate. In an implementation, a slant angle ($\theta1$) of the first slanted surface 31a with respect to the top of the cap plate 31 may be greater than 1° and less than 85°. In other words, as will be apparent to a person of ordinary skill in the art from the foregoing description and from the drawings, an angle formed by the flat top of the cap plate 31 and the first slanted surface 31a may be greater than 1° and less than 85°.

The second slanted surface 31b may be slanted so that its transverse cross-sectional area is increased toward the bottom of the cap plate 31, e.g., the second slanted surface 31b may be slanted toward the case 26 from the flat top of the cap plate 31. For example, the second slanted surface 31b may be slanted with an oblique angle with respect to a plane or surface that is parallel with the flat top of the cap plate 31. In an implementation, a slant angle ($\theta2$) of the second slanted surface 31b with respect to the top of the cap plate 31 may be greater than 1° and less than 85°. In other words, as will be apparent to a person of ordinary skill in the art from the foregoing description and from the drawings, an angle formed by the flat top of the cap plate 31 and the second slanted surface 31b may be greater than 1° and less than 85°.

In an implementation, a slant unit 26a connected to or continuous with the first slanted surface 31a and the second slanted surface 31b may be formed on a top of, e.g., a top edge of, the case 26. In an implementation, the slant unit 26a may have the same or a similar slant, e.g., slant angle, as the first slanted surface 31a and the second slanted surface 31b. In other words, as will be apparent to a person of ordinary skill in the art from the foregoing description and from the drawings, the slant unit 26a may be coplanar with the first slanted surface 31a or the second slanted surface 31b. In an implementation, the slant angle of the slant unit 26a may be greater than or less than the first slanted surface 31a and the second slanted surface 31b. In other words, as will be apparent to a person of ordinary skill in the art from the foregoing description and from the drawings, the slant unit 26a may not be coplanar with the first slanted surface 31a or the second slanted surface 31b.

Avoiders 52a and 62a may be formed on sides of the top insulation members 52 and 62 so that the top may be protruded to the outside. In an implementation, the top insulation members 52 and 62 may be formed such that transverse cross-sectional areas thereof are gradually increased towards tops thereof, e.g., away from the cap plate 31.

The avoiders 52a and 62a of the top insulation members 52 and 62 may be slanted upwardly. For example, the avoiders 52a and 62a may be slanted with an oblique angle with respect to the cap plate 31. In an implementation, a slant angle (θ3) of the avoiders 52a and 62a with respect to the top of the cap plate 31 may be greater than 30° and less than 85°.

When a slanted surface is formed on the cap plate 31, water condensed on the cap plate 31 may be easily moved or diverted to the bottom of the cap plate 31 and be discharged. As described above, the terminals 21 and 22 may be installed on the cap plate 31. Thus, if condensed moisture were to be gathered on the cap plate 31, an electrical path could generated between the cap plate 31 and the terminals 21 and 22 to thus increase a risk of a short circuit. However, according to an embodiment, condensed water that may be on the top of the cap plate 31 may be easily discharged or diverted to thereby improve safety.

In addition, the avoiders 52a and 62a may be formed on the top insulation members 52 and 62. Thus, if moisture were to be condensed near the terminals 21 and 22, movement of the moisture to the top of the top insulation member 52 and 62 would be prevented to thereby further improve safety.

Figure 4:
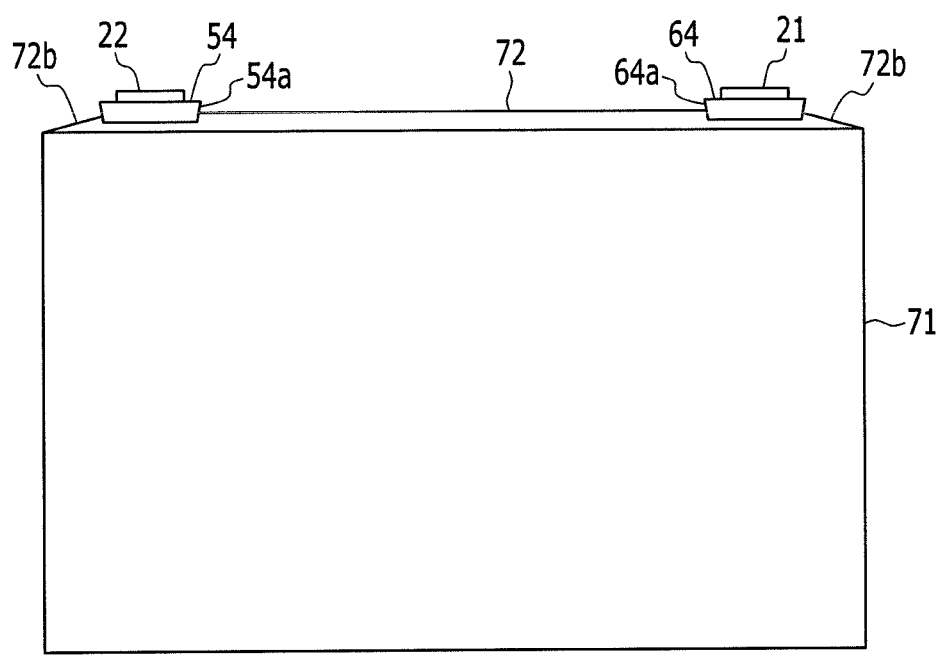
FIG. 4 illustrates a front view of a rechargeable battery according to an embodiment.
Figure 5:
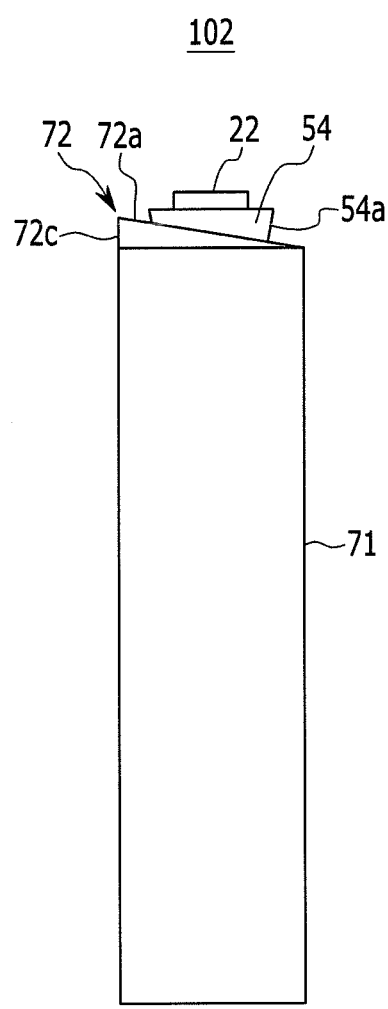
FIG. 5 illustrates a side view of the rechargeable battery of FIG. 4.

FIG. 4 illustrates a front view of a rechargeable battery according to an embodiment, and FIG. 5 illustrates a side view of the rechargeable battery of FIG. 4.

Referring to FIG. 4 and FIG. 5, the rechargeable battery 102 may have the same configuration as the rechargeable battery according to the previous embodiment, except for a structure of a cap plate 72. Accordingly, repeated descriptions of like elements may be omitted.

The rechargeable battery 102 may include a case 71, the cap plate 72 combined to or coupled with the top of the case 71, and a positive terminal 21 and a negative terminal 22 protruding at the top of the cap plate 72.

The cap plate 72 may have a square or rectangular plate shape. In an implementation, a first slanted surface 72a may be formed to be slanted in the widthwise direction on the cap plate 72, and a second slanted surface 72b may be formed at both sides of the cap plate 72 in the lengthwise direction.

The first slanted surface 72a may extend from an end of one long side edge of the cap plate 72 to another long side edge of the cap plate 72. The first slanted surface 72a may be slanted toward the bottom and may discharge or direct the condensed water generated on the top of the cap plate 72 downwardly.

The second slanted surface 72b may be slanted toward the bottom from the top of the cap plate 72. For example, both sides of the cap plate 72 in the lengthwise direction may be protruded to the outside as they go to the bottom. In other words, as will be apparent to a person of ordinary skill in the art from the foregoing description and from the drawings, the second slated surface 72b may be at sides of the first slanted surface 72a and may slat toward short side edges of the cap plate 72.

A top insulation member 64 (for insulating the positive terminal 21 and the cap plate 72) may be installed at the bottom of the positive terminal 21, e.g., between the positive terminal 21 and the cap plate 72. A top insulation member 54 (for insulating the negative terminal 22 and the cap plate 72) may be installed at the bottom of the negative terminal 22, e.g., between the negative terminal 22 and the cap plate 72.

Avoiders 54a and 64a may be formed on sides of the top insulation members 54 and 64 so that tops may be protruded to the outside. In an implementation, the top insulation members 54 and 64 may be formed so that the transverse cross-sectional areas thereof are gradually increased as they go to the top, e.g., away from the cap plate 72.

Figure 6:
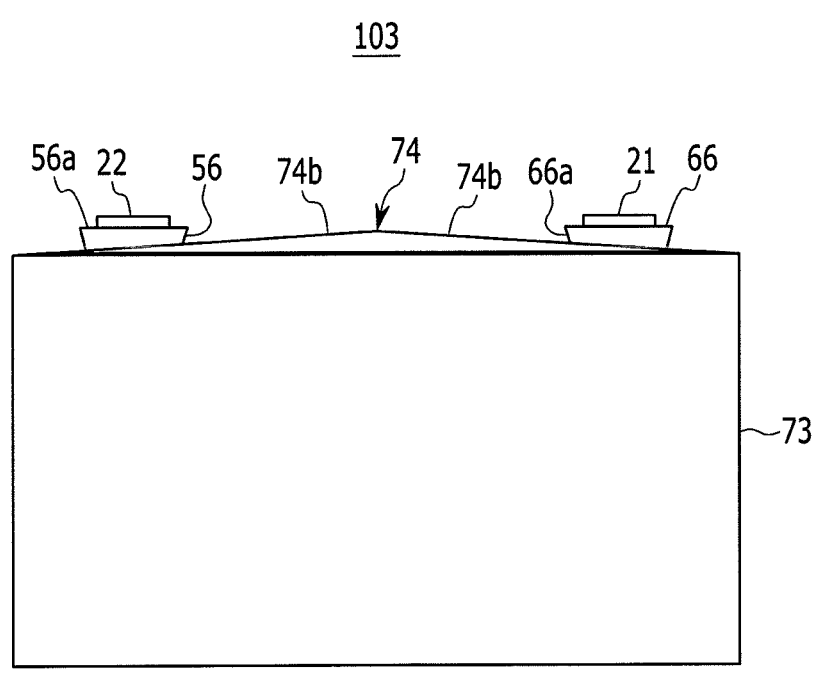
FIG. 6 illustrates a front view of a rechargeable battery according to an embodiment.
Figure 7:
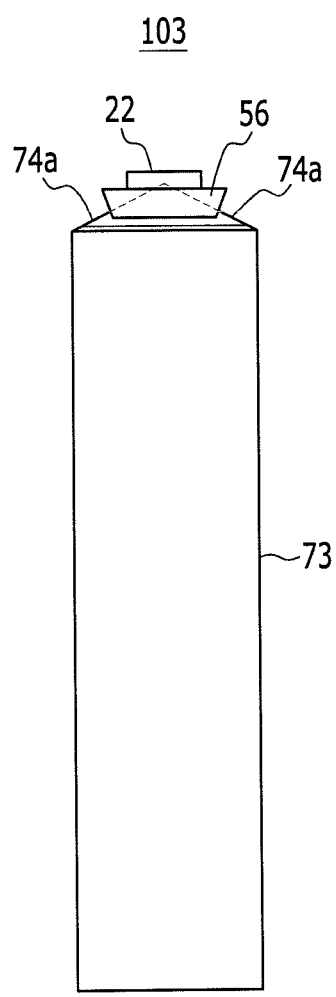
FIG. 7 illustrates a side view of the rechargeable battery of FIG. 6.

FIG. 6 illustrates a front view of a rechargeable battery according to an embodiment, and FIG. 7 illustrates a side view of the rechargeable battery of FIG. 6.

Referring to FIG. 6 and FIG. 7, the rechargeable battery 103 may have the same configuration as the rechargeable battery according to the previous embodiments except for a structure of a cap plate 74.

The rechargeable battery 103 may include a case 73, the cap plate 74 combined to or coupled with a top of the case 73, and a positive terminal 21 and a negative terminal 22 protruding at a top of the cap plate 74.

The cap plate 74 may have a square or rectangular plate shape. In an implementation, the cap plate 74 may include a first slanted surface 74a that is slanted toward both long side edges of the cap plate 74 in the widthwise direction, and a second slanted surface 74b that is slanted toward both short side edges of the cap plate 74 in the lengthwise direction.

In an implementation, the first slanted surface 74a may be slanted toward both long side edges of the cap plate 74 in the widthwise direction from the center of the cap plate 74. For example, the first slanted surface 74a may be slanted toward the bottom to downwardly discharge or direct any condensed water that may be formed at the top of the cap plate 74. In other words, as will be apparent to a person of ordinary skill in the art from the foregoing description and from the drawings, the cap plate 74 may not have a flat top, but rather may come to a point or a peak.

In an implementation, the second slanted surface 74b may be slanted toward both short side edges of the cap plate 74 in the lengthwise direction from the center of the cap plate 74. For example, the second slanted surface 74b may be slanted toward the bottom, and both short side edges of the cap plate 74 in the lengthwise direction may be protruded to the outside as they go to the bottom.

In an implementation, a water-repellent coating process may be applied to the first slanted surface 74a and the second slanted surface 74b. For example, a water-repellent coated film may be on the first slanted surface 74a and the second slanted surface 74b. The water-repellent coated film may be formed by coating an ingredient including, e.g., an oil or a silicon dioxide solution, on the top of the cap plate 74. When the water-repellent coated film is formed, a frictional force may be reduced, to facilitate discharging or directing of any condensed moisture that may form.

A top insulation member 66 (for insulating the positive terminal 21 and the cap plate 72) may be installed at the bottom of the positive terminal 21, e.g., between the positive terminal 21 and the cap plate 72. A top insulation member 56 (for insulating the negative terminal 22 and the cap plate 72) may be installed at the bottom of the negative terminal 22, e.g., between the negative terminal 22 and the cap plate 72.

Avoiders 56a and 66a may be formed on sides of the top insulation members 56 and 66 so that tops may be protruded to the outside. In an implementation, the top insulation members 56 and 66 may be formed so that transverse cross-sectional areas thereof are gradually increased, e.g., away from the cap plate 72.

By way of summation and review, one large-capacity rechargeable battery may be configured of a plurality of rechargeable batteries connected in series, wherein the rechargeable battery may be formed in a cylindrical shape or a square shape.

When moisture is condensed on an external side of a rechargeable battery made of a metal such as aluminum, it may be short-circuited.

The embodiments provide a rechargeable battery having improved safety.

According an embodiment, the slanted surface may be formed on the cap plate so that condensed moisture on the cap plate is easily discharged or diverted.

The embodiments provide a rechargeable battery having an improved configuration of a cap plate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly including a positive electrode and a negative electrode;
a case including a space receiving the electrode assembly;
a cap plate coupled with the case; and
a terminal electrically connected to the electrode assembly, the terminal protruding outside of the cap plate,
wherein a top of the cap plate has a slanted surface, and
wherein the slanted surface is inclined along at least one outermost side edge of the cap plate such that the at least one inclined outermost side edge of the cap plate contacts the case along an entire length of the at least one inclined outermost side edge of the cap plate.

2. The rechargeable battery as claimed in claim 1, wherein the cap plate has a rectangular plate shape with two outermost side edges.

3. The rechargeable battery as claimed in claim 2, wherein:
the slanted surface is at both of the outermost side edges of the cap plate with respect to a widthwise direction of the cap plate.

4. The rechargeable battery as claimed in claim 2, wherein:
the slanted surface is on both of the outermost side edges of the cap plate with respect to a lengthwise direction of the cap plate.

5. The rechargeable battery as claimed in claim 1, wherein the case includes a slant unit at a top thereof, the slant unit being slanted and being connected to the slanted surface of the cap plate.

6. The rechargeable battery as claimed in claim 2, wherein the slanted surface extends from one of the outermost side edge of the cap plate in a widthwise direction to another of the outermost side edge of the cap plate.

7. The rechargeable battery as claimed in claim 2, wherein the slanted surface extends toward both of the outermost side edges of the cap plate in a lengthwise direction from a center of the cap plate.

8. The rechargeable battery as claimed in claim 2, wherein the slanted surface extends toward both of the outermost side edges of the cap plate in a widthwise direction from a center of the cap plate.

9. The rechargeable battery as claimed in claim 1, wherein the slanted surface is slanted toward a bottom of the cap plate.

10. The rechargeable battery as claimed in claim 1, further comprising a top insulation member that insulates the terminal from the cap plate, the top insulation member being at a bottom of the terminal and having a transverse cross-sectional area that is gradually increased in a direction away from the cap plate.

11. The rechargeable battery as claimed in claim 1, further comprising a top insulation member that insulates the terminal from the cap plate, the top insulation member being at a bottom of the terminal and including an upwardly slanted avoider on a side thereof.

12. The rechargeable battery as claimed in claim 1, wherein a water-repellent coating process is applied to the slanted surface of the cap plate.

13. The rechargeable battery as claimed in claim 1, further comprising a water-repellent coating on the slanted surface of the cap plate.

14. A rechargeable battery, comprising:
an electrode assembly including a positive electrode and a negative electrode;
a case including a space receiving the electrode assembly;
a cap plate coupled with the case;
a terminal electrically connected to the electrode assembly, the terminal protruding outside of the cap plate; and
a top insulation member that insulates the terminal from the cap plate, the top insulation member being at a bottom of the terminal and including an upwardly slanted avoider on a side thereof,
wherein a top of the cap plate has a slanted surface.

* * * * *